(12) United States Patent  (10) Patent No.: US 8,640,553 B2
Barnett et al.  (45) Date of Patent: Feb. 4, 2014

(54) WHEEL FORCE MEASUREMENT SYSTEM

(75) Inventors: Sol Barnett, Wingfield (GB); Randy G. Graves, Huntersville, NC (US); Guy E. Leake, Gastonia, NC (US); Brian J. Nelson, Concord, NC (US); Andrew J. Boram, Huntersville, NC (US); Leo R. Benetti-Longhini, Tullahoma, TN (US); Joel Allan Walter, Canton, MI (US)

(73) Assignee: Wind Shear, Inc., Oxnard, CA (US)

( * ) Notice: Subject to any disclaimer, the term of this patent is extended or adjusted under 35 U.S.C. 154(b) by 216 days.

(21) Appl. No.: 13/107,735

(22) Filed: May 13, 2011

(65) Prior Publication Data

US 2011/0277560 A1  Nov. 17, 2011

Related U.S. Application Data

(60) Provisional application No. 61/345,042, filed on May 14, 2010.

(51) Int. Cl.
*G01L 1/22* (2006.01)

(52) U.S. Cl.
USPC .................................................. 73/862.045

(58) Field of Classification Search
USPC ....................................... 73/862.041–862.046
See application file for complete search history.

(56) References Cited

U.S. PATENT DOCUMENTS

| | | | |
|---|---|---|---|
| 5,281,911 A * | 1/1994 | Caron et al. .................. | 324/174 |
| 5,894,094 A | 4/1999 | Kuchler et al. | |
| 5,969,268 A | 10/1999 | Sommerfeld et al. | |
| 6,230,555 B1 * | 5/2001 | Doerrie et al. .................. | 73/129 |
| 6,278,216 B1 * | 8/2001 | Li ................................. | 310/424 |
| 6,915,708 B2 * | 7/2005 | Isono ....................... | 73/862.041 |
| 7,716,996 B2 * | 5/2010 | Muller et al. ............. | 73/862.044 |
| 7,775,128 B2 * | 8/2010 | Roessingh et al. ........ | 73/862.191 |
| 2002/0059837 A1 | 5/2002 | Meyer et al. | |
| 2004/0159165 A1 | 8/2004 | Nieding et al. | |
| 2005/0016296 A1 | 1/2005 | Inoue | |
| 2007/0107536 A1 * | 5/2007 | Mastinu et al. .......... | 73/862.043 |

* cited by examiner

*Primary Examiner* — Max Noori
(74) *Attorney, Agent, or Firm* — McDermott Will & Emery LLP

(57) ABSTRACT

A system for measuring forces applied to a moving vehicle is disclosed. The system includes a sensor plate that is configured to be mounted between a wheel and a hub of the vehicle. The sensor plate is further configured to sense at least one of the set of longitudinal, vertical, and lateral forces as well as longitudinal and vertical moments that are transferred between the wheel and the hub through the sensor plate. The system also includes an electronics package that is coupled to the sensor plate. The electronics package is configured to measure the forces and moments sensed by the sensor plate and provide an output comprising at least one signal representative of at least a portion of the measurements. The system also includes data system coupled to the electronics package, the data system configured to receive the output of the electronics package.

8 Claims, 14 Drawing Sheets

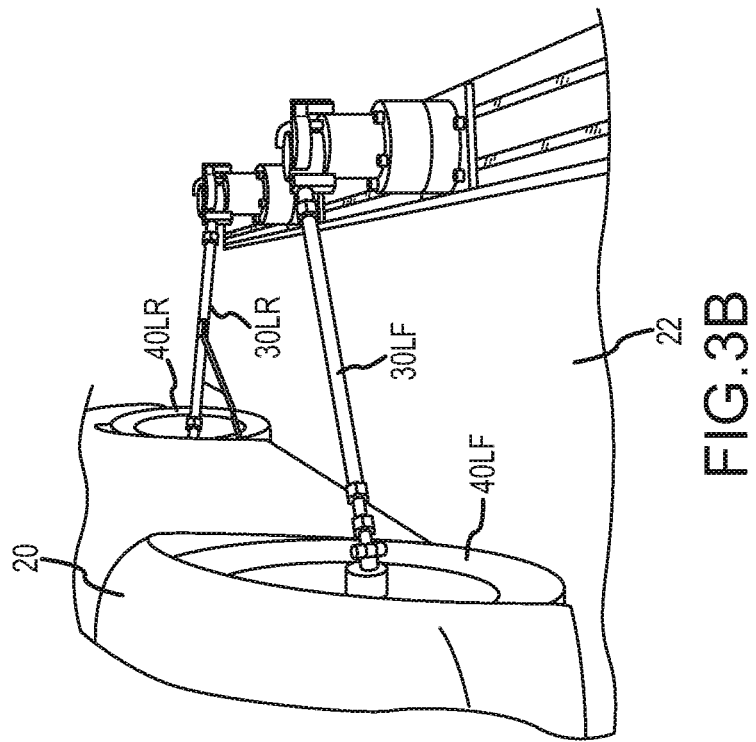
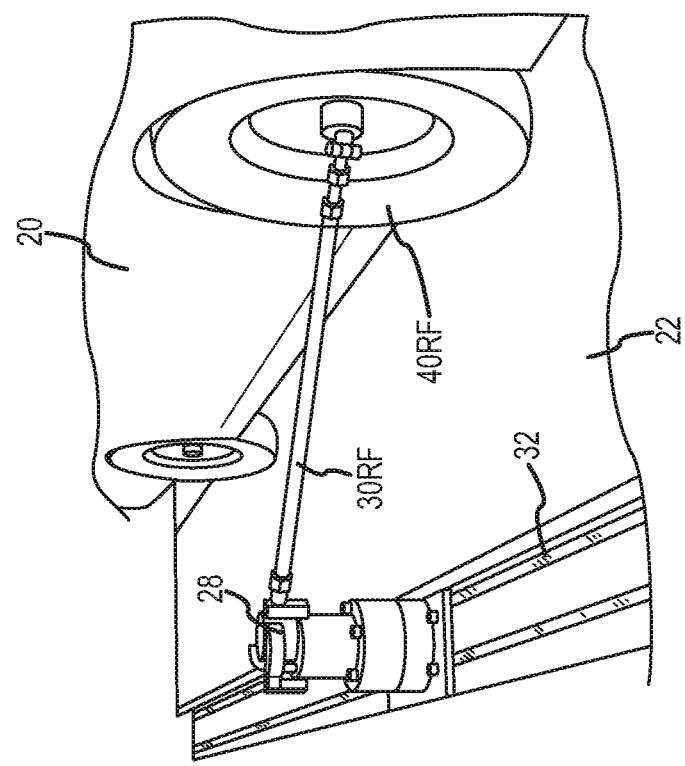

WHEEL FORCE MEASUREMENT SYSTEM

This application claims priority to U.S. Provisional Patent Application No. 61/345,042, filed on May 14, 2010, which is incorporated by reference herein in its entirety.

BACKGROUND

The present disclosure concerns the analysis of forces that act upon a ground vehicle and, more particularly, a system for measuring forces within a rotating wheel assembly.

Traditional wind tunnels are valuable tools in determining how air flows around objects and ground vehicles. Testing the aerodynamics of ground vehicles, especially at the high speeds achieved by today's race cars, is affected by the stationary floor on which the ground vehicle rests in the wind tunnel. While rollers can and have been placed under the wheels to allow the wheels to turn at the proper speed, the air flow is still affected by the stationary boundary condition of the floor as the wind passes under and around the ground vehicle.

The development of "rolling road" wind tunnels has addressed the issue of the stationary floor by providing a moving surface under the ground vehicle. An example of a rolling road support floor is shown in FIG. 1. A continuous belt, typically a stainless steel sheet, passes around a pair of large rollers and under the test ground vehicle while supported by a series of smaller rollers. The ground vehicle rolls freely on the top of the belt and is held in place by restraint bars such as shown in FIGS. 2 and 3. Aerodynamic forces can be measured using load cells integrated into the restraint system. Ground vehicles can be tested at speeds in excess of 290 kilometers per hour (180 miles per hour).

SUMMARY

The load cells supplied with rolling road systems for measuring aerodynamic drag and side-force are, in fact, measuring a combination of aerodynamic and mechanical forces. The side-force measurements also appear to be unstable because the mechanical forces induced by the tires' physical properties are influenced by the aerodynamic down-force and, as such, cannot be measured separately and tared out. In addition, existing side-force measurement equipment that attaches to the wheels of the ground vehicle under test tends to be large and cause a significant disruption of the air flow in the vicinity of the wheels, further affecting the measurements of the side forces. It is desirable to provide a way to separately measure the longitudinal and lateral mechanical forces caused by the tires without disrupting the aerodynamics of the air flow around the ground vehicle and especially around the tires.

The present invention, when installed on a test vehicle, directly and separately measures the mechanical side-force, allowing that to be removed from the total measurement, leaving the desired aerodynamically induced side-force component. The present invention also measures the mechanical force component in the longitudinal direction, eliminating the need for a rolling resistance tare. Use of the present invention yields increased accuracy of the aerodynamic force measurement with minimal impact on the aerodynamic flow field.

In certain embodiments, a system for measuring forces applied to a moving ground vehicle is disclosed. The system includes a sensor plate that is configured to be mounted between a wheel and a hub of the ground vehicle. The sensor plate is further configured to sense at least one of the set that includes radial, longitudinal, and vertical forces as well as longitudinal and vertical moments that are transferred between the wheel and the hub through the sensor plate. The system also includes an electronics package that is coupled to the sensor plate. The electronics package is configured to measure the forces and moments sensed by the sensor plate and provide an output comprising at least one signal representative of at least a portion of the measurements. The system also includes a data system that is coupled to the electronics package. The data system is configured to receive the output of the electronics package.

In certain embodiments, a method of measuring forces applied to a moving ground vehicle is disclosed. The method includes the step of coupling a first section of a sensor plate that is configured to sense at least one of the set that includes radial, longitudinal, and vertical forces as well as longitudinal and vertical moments transferred from the first section to a second section of the sensor plate to a hub of the ground vehicle. The method also includes the steps of coupling a wheel to the second section of the sensor plate, rotating the wheel with respect to the hub, measuring the forces and moments sensed by the sensor plate, and receiving at least one measurement in a data system.

In certain embodiments, a sensor plate that is configured to be mounted between the first and second elements of a rotating assembly is disclosed. The sensor plate includes a first section configured to couple to the first element, a second section configured to couple to the second element, a plurality of measurement arms each coupled between the first and second sections, and a plurality of strain gauges coupled to the measurement arms.

In certain embodiments, a system for measuring forces transferred between the first and second elements of a rotating assembly is disclosed. The system includes a sensor plate that is configured to be mounted between the first and second elements. The sensor plate is further configured to sense at least one of the set that includes radial, longitudinal, and vertical forces as well as longitudinal and vertical moments transferred between the first and second elements through the sensor plate. The system also includes an electronics package that is coupled to the sensor plate. The electronics package is configured to measure the forces and moments sensed by the sensor plate and provide an output comprising at least one signal representative of at least a portion of the measurements. The system also includes a data system that is configured to receive the output of the electronics package.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 3A and 3B illustrate an example restraint system used to test ground vehicles on a rolling road system.

DETAILED DESCRIPTION

The description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The subject technology provides lateral (axial) and vertical/longitudinal (radial) mechanical force components with a resolution that is acceptable for wind tunnel work and with negligible aerodynamic interference. The system includes a rotating transducer with force sensing (strain-gauged) measurement arms. The system further includes on-board instrumentation amplifiers for signal conditioning and on-board transmitter/receiver for telemetry transfer of measurement signals/parameters to and from a data acquisition system.

The methods and systems disclosed herein are presented in terms of a 4-wheeled car being tested in a rolling road wind tunnel. These same methods and systems can be applied to the testing of other ground vehicles, such as trucks, and vehicles having fewer wheels, such as motorcycles, or a greater number of wheels. These same methods and systems can also be applied to the testing of ground vehicles outside of a wind tunnel. Nothing in this disclosure should be interpreted, unless specifically stated as such, to limit the application of any claimed method or system disclosed herein to a car or a four-wheeled vehicle or use in conjunction with a wind tunnel.

In this disclosure, the term "wheel" is used to refer to the rigid structure usually made of metal that provides the features for attachment to a hub of a ground vehicle and sometimes referred to as a "rim," and the term "wheel assembly" is used to refer to the assembly that includes a wheel and a tire.

Figure 1:
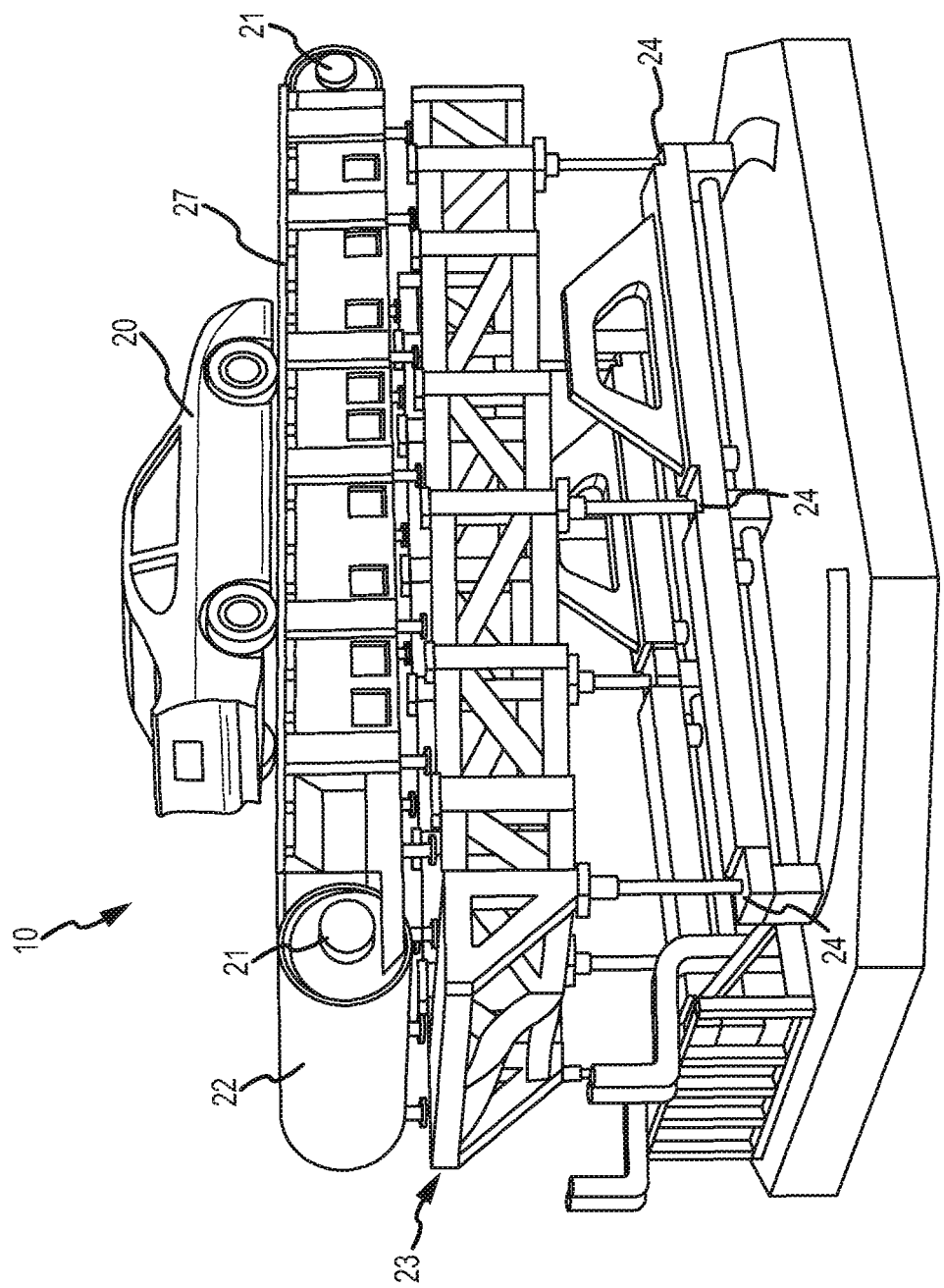
FIG. 1 illustrates a rolling road support system.

FIG. 1 illustrates a rolling road system (RRS) 10. In use, a car 20 rests on top of a continuous belt 22 that passes around large diameter rollers 21 at each end of the RRS 10. The belt 22 is typically made of stainless steel. The car 20 is supported by air bearings 27 under the top portion of the belt 22. The sheet and rollers are mounted on a frame 23 that is further supported by a number of load cells 24, such that the dynamic down-forces applied by the car 20 as a whole to the rolling road can be measured.

Figure 2:
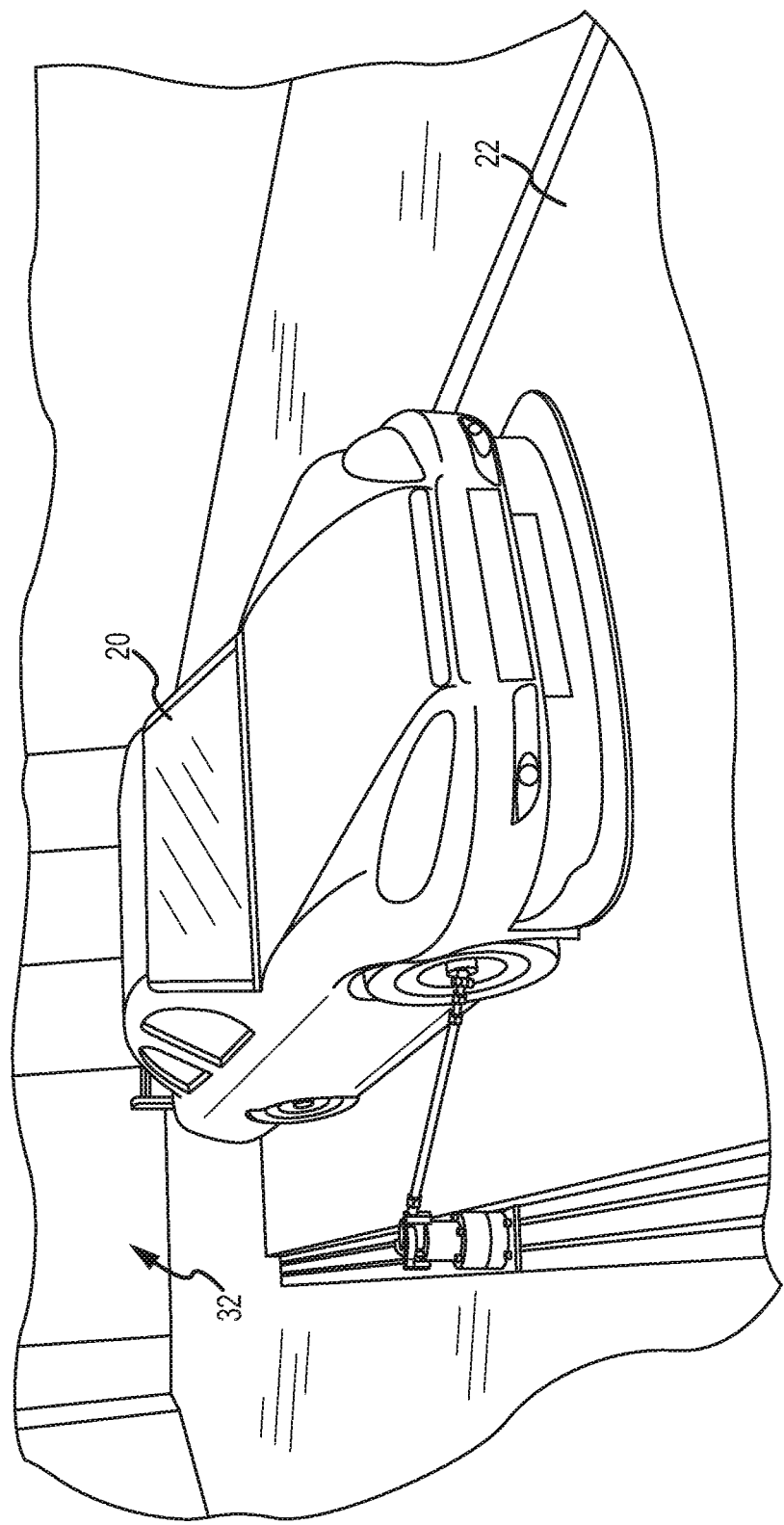
FIG. 2 illustrates a car being tested in a rolling road wind tunnel.

FIG. 2 illustrates a car 20 being tested in a rolling road wind tunnel. The top surface of the rolling road belt 22 is visible under the car 20. The air intake 32 at the downstream end of the wind tunnel is visible behind the car 20. A portion of the Vehicle Restraint System (VRS) that holds the car 20 in place on the RRS 10 is visible and is discussed in more detail with respect to FIGS. 3A and 3B.

FIGS. 3A and 3B illustrate an example VRS used to test cars 20 on a RRS 10. FIG. 3A shows the right-side portion of the VRS, which includes a front-right constraint rod 30RF attached to the right front wheel assembly 40RF and one end at to a load cell 28 at the other end. The load cell 28 is attached to a slotted track along the side of the top portion of belt 22 such that it can be moved to accommodate a variety of vehicles.

FIG. 3B illustrates the portion of the VRS on the left side of the car 20. Constraint rod 30LF is attached at one end to the left front tire 40LF. Constraint rod 30LR is attached at one end to the left rear tire 40LR. The combination of constraint rods 30RF, 30LF, and 30LR, provide redundant positioning of the car 20 on the top surface of the belt 22.

Figure 4:
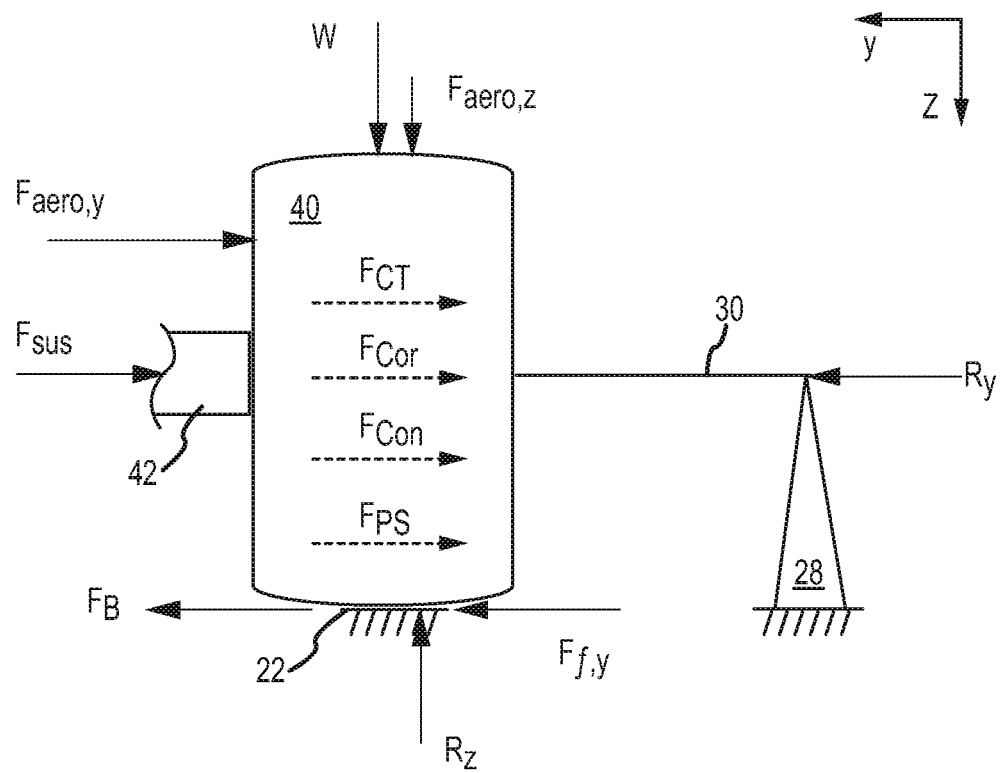
FIG. 4 is a diagram depicting the forces that are transmitted through a wheel assembly of a moving ground vehicle according to certain aspects of the present disclosure.

FIG. 4 is a diagram depicting the forces that are transmitted through a wheel assembly 40 of a moving car 20 according to certain aspects of the present disclosure.

In the vertical direction (direction z in FIG. 4), the weight W of the car 20 and the vertical aerodynamic force $F_{aero,z}$ is opposed by the reaction force $R_z$ that is applied to the wheel assembly 40 by the belt 22. $R_z$ is measured by the load cells 24 of FIG. 1. W can be determined by taking a measurement of $R_z$ while the wind tunnel and RRS 10 are turned off. The dynamic vertical aerodynamic force $F_{aero,z}$ can accurately be measured by considering the measured W as a tare and subtracting W from the dynamic measurements of $R_z$.

In the lateral direction (direction y in FIG. 4), the reaction force $R_y$ is the force measured by the load cell 28 through the constraint arm 30. There are a number of forces applied by various elements of the car 20 and RRS 10 as well as the air moving over the car 20. The vehicle's suspension system imparts a force $F_{sus}$ through shaft 42 and hub 44 (not visible in FIG. 4). This force is different for each vehicle at each speed as well as different for different wheels and ride heights. There is an aerodynamic side force $F_{aero,y}$ applied to the wheel assembly 40 and a frictional side force $F_{f,y}$ applied at the interface of the belt 22 and the wheel assembly 40. There is also a belt steering reaction force $F_B$. The frictional force $F_{f,y}$ applied by the belt 22 to the wheel assembly 40 in turn applies a force to the end roller 21 causing the belt 22 to move laterally on the roller 21. The RRS 10 has a feedback steering system which acts to keep the rear portion of the belt 22 centered on the rear roller 21. However, the front of the belt 22 is free to move. The belt steering force cannot be measured and observation of the position of the front of the belt 22 gives only an indirect estimate of the effect of the belt steering force $F_B$.

Four additional forces are shown in FIG. 4 that are generated internally by the tire of wheel assembly 40 and so do not rightly belong on a free body diagram but each generates a lateral force that affects the magnitude, direction, and distribution of reaction forces between the measured force at the load cell 28 and the unmeasured force at the tire contact patch with belt 22. Ply steer $F_{PS}$ and conicity $F_{Con}$ are related to the construction of the tire. Ply steer is a result of asymmetry in the tire's belt layers. It results in the tendency of a freely rolling tire to deviate from an initially straight trajectory to a diagonal one. Ply steer does not depend on the rotational sense of the tire. Conicity is a result of side-to-side differences in the tire, such as an asymmetrical offset in the position of the belt. The direction of the conicity force can be reversed by reversing the rotation of the tire (e.g., moving a wheel assembly 40 from the right side to the left side of car 20). $F_{CT}$ and $F_{Cor}$ refer to camber thrust and cornering force, respectively. Camber thrust occurs when the wheel assembly 40 is inclined relative to the vertical axis. Cornering force is generated when a slip angle exists between the wheel assembly 40 and the belt 22. For a given tire set, there is only limited opportunity to control the magnitude of these four internal tire forces, as camber and slip angle will change with ride height, and ride height is perhaps the single most important independent variable in a typical race car test.

As is apparent from the diagram of FIG. 4, there is one measured force and six forces that are not measured. Unlike the vertical forces, these lateral forces cannot accurately be tared out. In a static tare, all lateral forces are zero. It is possible to run the car 20 and the RRS 10 at full speed without the wind tunnel activated, but $F_{PS}$, $F_{Con}$, $F_{CT}$, $F_{Car}$, and $F_{f,y}$ are all present, continuously varying, and inseparable. The no-wind test also does not completely eliminate the aerodynamic forces applied to the wheel assembly 40 by the turbulence generated by the rotation of the wheel assembly 40. One approach to separating out the aerodynamic force $F_{aero,y}$ is to dynamically measure the sum of the forces $F_{PS}$, $F_{Con}$, $F_{CT}$, $F_{Car}$, and $F_{f,y}$ between the point of application to the wheel assembly 40 at the contact patch with belt 22 and the load cell 28 and to subtract these forces from the dynamic lateral force measurement.

Figure 5:
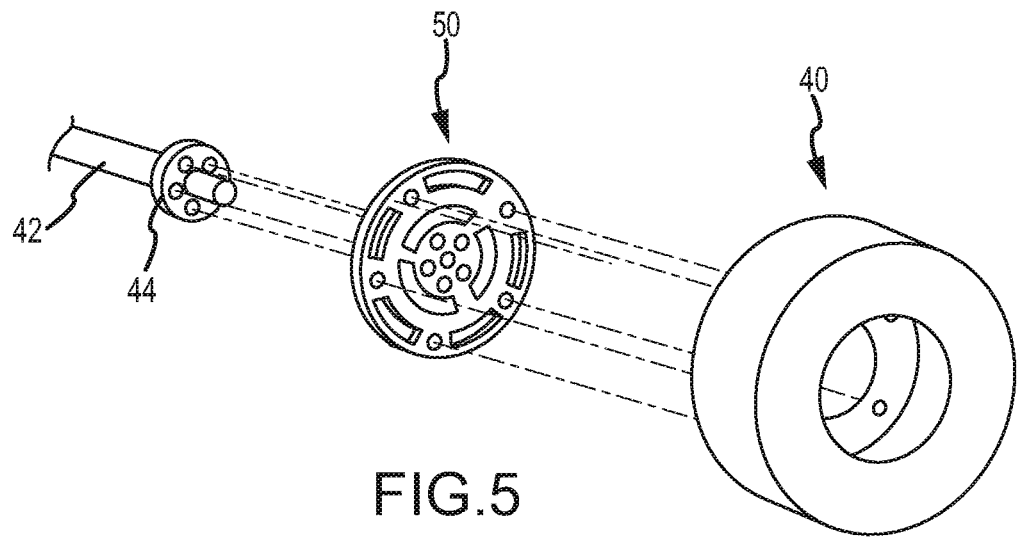
FIG. 5 is an exploded view of a wheel assembly and hub assembly according to certain aspects of the present disclosure.

FIG. 5 is an exploded view of a wheel assembly 40 and hub assembly 44 according to certain aspects of the present disclosure. A sensor plate 50 is mounted to a hub 44 that is attached, in this example, to a shaft 42. In other embodiments, the hub 44 is attached to other suspension elements (not shown) that may be driven or not driven by the engine. A wheel assembly 40 is attached to the sensor plate 50.

Figure 6:
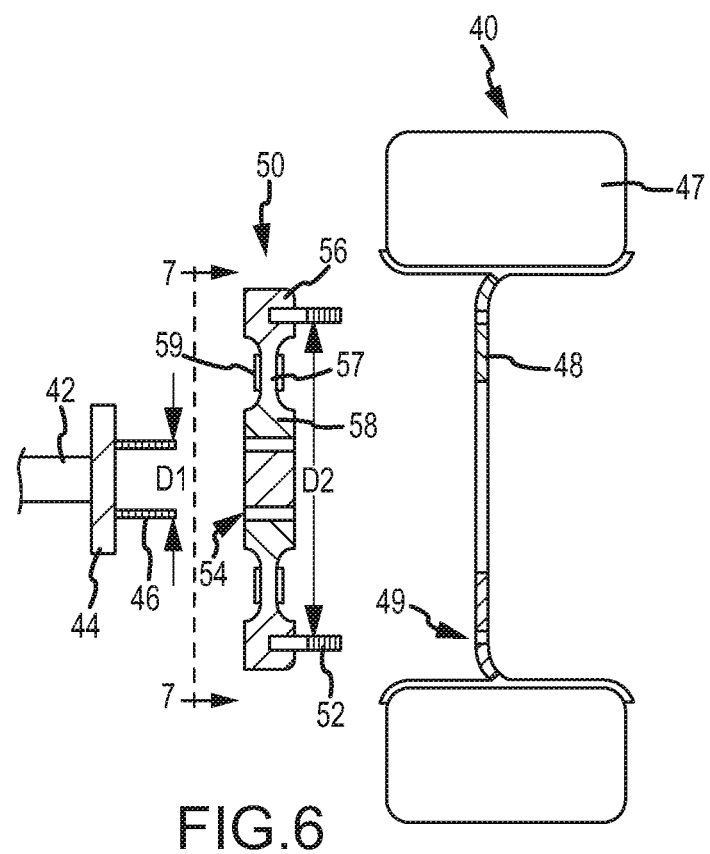
FIG. 6 is a cross-section of the exploded assembly of FIG. 5 according to certain aspects of the present disclosure.

FIG. 6 is a cross-section of the exploded assembly of FIG. 5 according to certain aspects of the present disclosure. In this embodiment, the hub 44 is a standard design with mounting studs 46 located on a bolt circle having a first diameter D1. The sensor plate 50 has a first section 58 that includes mounting holes 54 that are configured to mate with studs 46. In certain embodiments, the first section 58 is clamped to the hub 44 by wheel nuts (not shown) that screw onto the studs 46. The sensor plate 50 also includes a second section 56 that has, in this embodiment, a set of mounting studs 52 positioned on a bolt circle having a second diameter D2. The wheel assembly 40 has a wheel 48 with a set of mounting holes 49 that are configured to mate with studs 52. In certain embodiments, the wheel 48 is clamped to the second section 56 by wheel nuts (not shown) that screw onto the studs 52.

The cross-sections of the various components in FIG. 6 have not been taken as planar sections through the respective components, and are provided with some distortion of the cross-sectional plane in order to more simply explain the construction. For example, the studs 46, 52 and holes 54, 49 are provided, in this example, in a quantities of five that are evenly distributed about circles, yet the cross-sections show pairs of studs 46, 52 and holes 54, 49 on the full diameter of the respective circles.

The sensor plate 50 further comprises a plurality of measurement arms 57, i.e. flexure elements or spokes, that are coupled between the first and second sections 58, 56. The measurement arms 57 are, in certain embodiments, thinner than the first and second section 58, 56 so as to be more flexible. In certain embodiments, the measurement arms 57 have profiles (not shown) that provide for greater flexibility in certain areas than in other areas. In certain embodiments, the measurement arms 57 have a constant thickness. In certain embodiments, the measurement arms 57 have a constant width in the plane of the sensor plate 50. In certain embodiments, the sensor plate 50 further comprises one or more sensors 59 coupled to one or more of the measurement arms 57 in one or more locations. The sensors 59 and the locations of the sensors 59 are discussed in greater detail with respect to FIGS. 13A and 13B.

Figure 7:
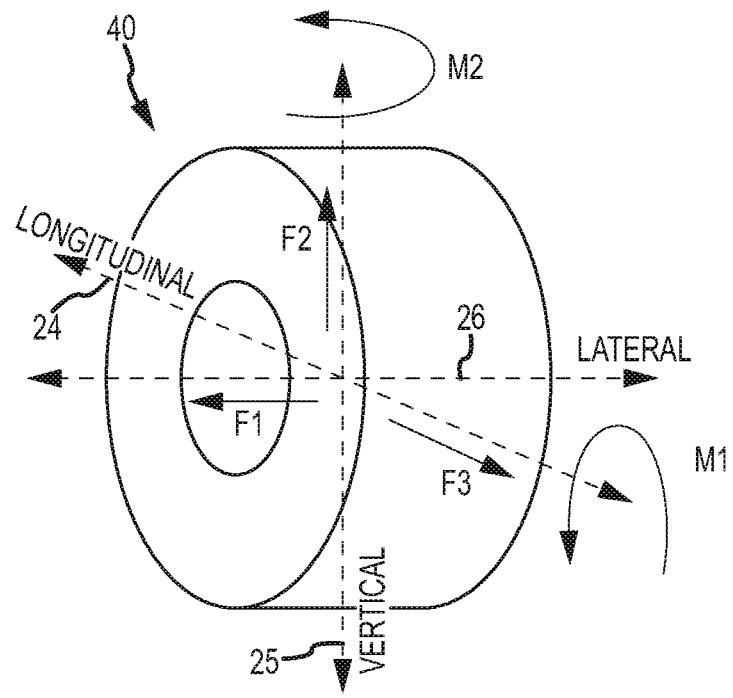
FIG. 7 illustrates the coordinate axes, forces, and moments of a wheel assembly according to certain aspects of the present disclosure.

FIG. 7 illustrates the coordinate axes, forces, and moments of a wheel assembly 40 according to certain aspects of the present disclosure. The longitudinal, vertical, and lateral axes 24, 25, 26 are orthogonal to each other and are defined relative to the car 20 (not shown) to which the wheel assemblies 40 are mounted. The longitudinal axis 24 runs front-to-back, the vertical axis 25 runs up-and-down, and the lateral axis 26 runs left-to-right. Forces F1, F2, and F3 are defined as aligned with the lateral, vertical, and longitudinal axes 26, 25, and 24, respectively. Two moments M1 and M2 are defined about the longitudinal and vertical axes 24,25, respectively. While the forces F1, F2, F3 and moments M1, M2 are shown with polarities as defined by the direction of the arrows shown in FIG. 7, these are arbitrary definitions and may be reversed in other embodiments.

Figure 8A:
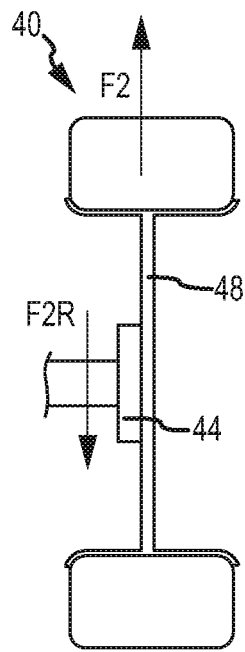
FIGS. 8A-8C depict the deformation of a wheel in response to various moments and forces according to certain aspects of the present disclosure.
Figure 8B:
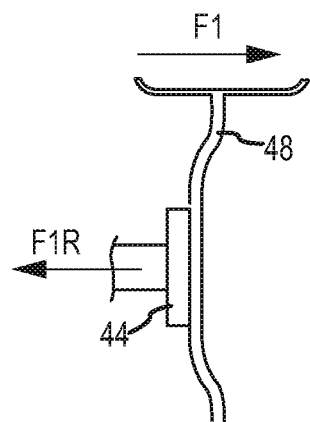
Figure 8C:
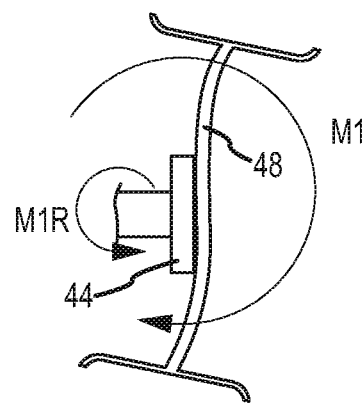

FIGS. 8A-8C depict the deformation of a wheel 48 in response to various moments and forces according to certain aspects of the present disclosure. FIG. 8A depicts a wheel 48 subject to an applied force F2. The same condition would exist for a force F3, which would be orthogonal to the force F2, or any combination of forces F2 and F3. A reaction force F2R is developed at the hub 44 to counteract the applied force F2. The sensor plate 50 will be stretched in the vertical axis 25, in this example, in the portion of the sensor plate 50 between the reaction force F2R and the applied force F2. Sensing the stresses associated with this type of applied force F2 is discussed in greater detail with respect to FIGS. 13A and 13B.

In FIG. 8B, a lateral force F1 is applied to the wheel 48, and a reaction force F1R is developed at the hub 44. As the force F1 is applied, in this example, as evenly distributed around the wheel assembly 50, the wheel 48 distorts evenly around the circumference and there is no reaction moment developed at the hub 44. It can be seen that wheel 48 is deforming in a double-bending mode, forming an "S" shape between the center and the rim of the wheel 48. Sensing the stresses associated with this type of applied force F1 are discussed in greater detail with respect to FIGS. 13A and 13B.

FIG. 8C depicts a wheel 48 subject to an "overturning" moment M1 about the longitudinal axis 25. The same condition would exist for a moment M2 about the vertical axis 26, which would be orthogonal to the moment M1, or any combination of moments M1 and M2. A reaction moment M1R is developed at the hub 44. It can be seen that wheel 48 is deforming in an asymmetric shape, being away from the hub 44 at the top and toward the hub 44 at the bottom. Sensing the moments associated with this type of applied moment M1 are discussed in greater detail with respect to FIGS. 13A and 13B.

Figure 9:
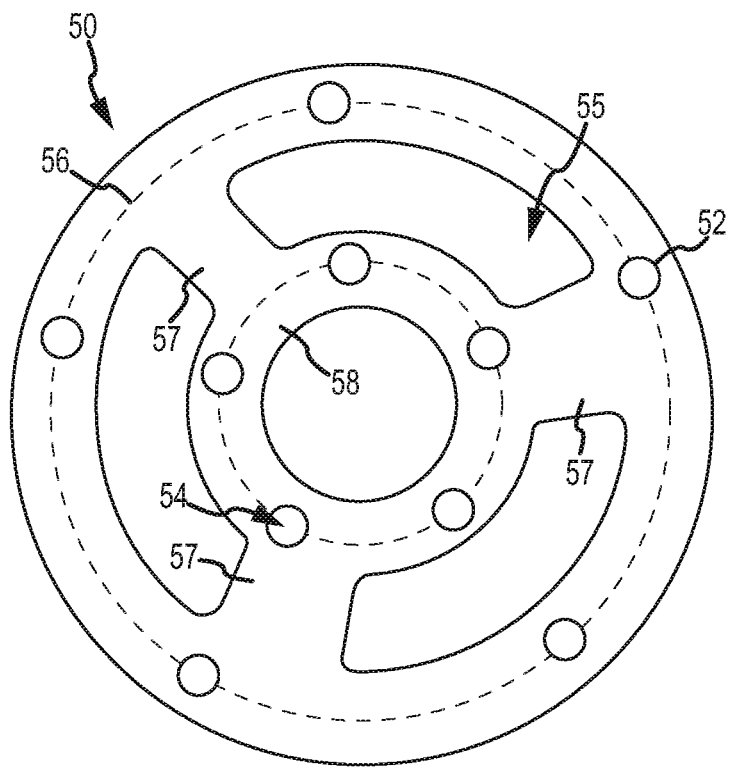
FIG. 9 depicts an exemplary sensor plate according to certain aspects of the present disclosure.

FIG. 9 depicts an exemplary sensor plate 50 according to certain aspects of the present disclosure. The sensor plate comprises a first section 58 with, in this embodiment, five attachment holes 54 evenly positioned about a bolt circle. The sensor plate also includes a second section 56 with, in this embodiment, five attachment studs 52 (only the backs of the studs are visible in FIG. 9) evenly positioned about a bolt circle. In the embodiment of FIG. 9, there are three measurement arms 57 that are coupled between the first and second sections 58, 56. In this embodiment, the measurement arms 57 are evenly disposed about the circumference of the sensor plate 50. In certain embodiments, there may be more than three measurement arms 57. In certain embodiments, there may be less than three measurement arms 57. In this embodiments, there is at least one strain gauge (not shown in FIG. 9) attached to each measurement arm 57.

Figure 10:
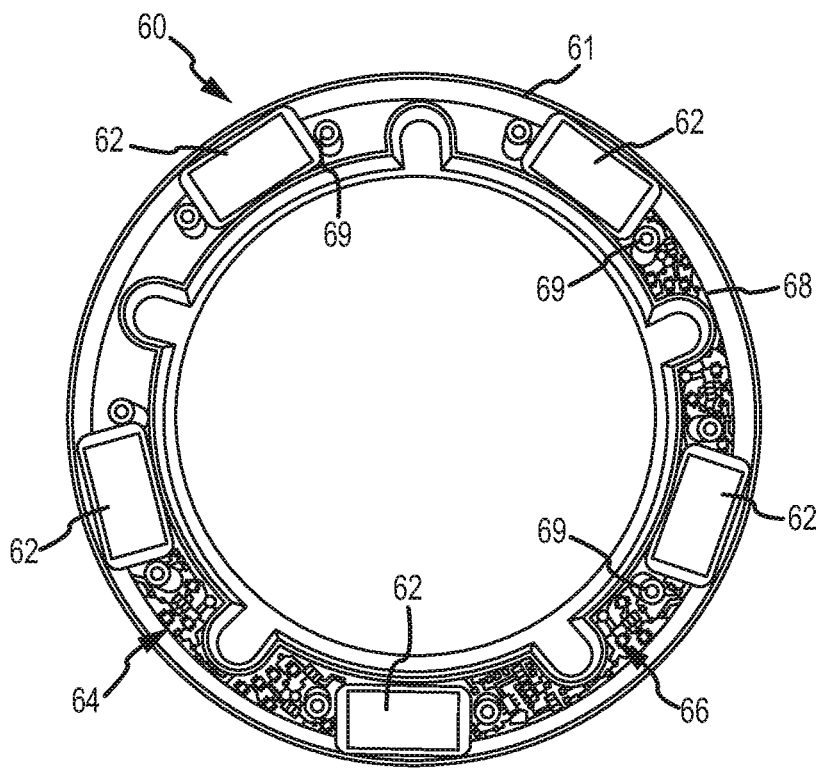
FIG. 10 depicts an exemplary electronics package according to certain aspects of the present disclosure.

FIG. 10 depicts an exemplary electronics package 60 according to certain aspects of the present disclosure. The electronics package 60 includes, in this embodiment, strain gauge amplifiers 64 and signal processors 66 that are configured to measure the strain sensed by the strain gauges of FIG. 7 and provide an output signal that includes at least one signal representative of at least a portion of the measurements. The electronics package 60 shown in FIG. 10 also includes a wireless transmitter 68 to transmit the output signal from the signal processors 66. The electronics package 60 also includes multiple battery packs 62 to power the electronics during the test. The terminals 69 provide a connection point for the wires that lead to the strain gauges of the sensor plate 50. The electronics are all disposed, in this embodiment, in housing 61.

On-board electronics provide stable excitation to the strain gauges and amplification of the signals resulting from the flexure of the measurement arms 57. Hermetically sealed battery packs 62 are used to supply the electrical energy used to operate the rotating measurement system 100. The number and type of batteries used to supply electrical energy may vary for different applications. In certain embodiments, 3.6V, 2.4 Ah lithium thionyl chloride batteries are used to power the measurement system 100. In certain embodiments, alternating current (AC) power is supplied from an external source (not shown) through inductive noncontact coils (not shown) to a power circuit that converts the power to low-voltage direct current (DC) power suitable to operate the on-board electronics, thereby eliminating the need for batteries and the consequent limitation on continuous operation. In certain embodiments, the output signals from the electronics package 60 are transmitted over a conductive system that includes slip-rings (not shown) or equivalent conductive rotating couplings.

Figure 11:
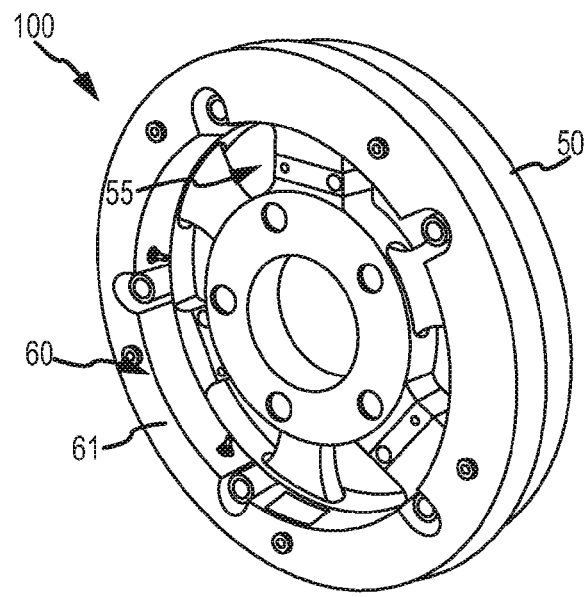
FIG. 11 depicts an exemplary measurement system according to certain aspects of the present disclosure.

FIG. 11 depicts an exemplary measurement system 100 according to certain aspects of the present disclosure. In use, the assembled electronics package 60 and sensor plate 50 forms a self-contained measurement system 100 that measures the longitudinal, vertical, and lateral forces as well as longitudinal and vertical moments that are transferred between the wheel 48 and the hub 44. In certain embodiments, the combined longitudinal and vertical forces are sensed as one or more radial forces during the rotation of the wheel assembly 40 and demodulated into the longitudinal and vertical forces using the rotational position of the wheel assembly 40. The system has no wires or other physical connections to external systems that might interfere with the dynamics of the car 20 or the airflow around the car 20 or other ground vehicle.

In the embodiment of FIG. 11, it can be seen that a housing 61 forms an external cover over the electronics 62, 64, 66, and 68. The housing 61 is attached to the sensor plate 50 after the electrical connections are formed between the posts 69 and the sensors on the sensor plate 50. The housing provides mechanical support and protection to the enclosed electronics as well as a smooth aerodynamic surface to reduce the effects of the rotation of the measurement system 100 on the local air flow.

The sensor plate 50 and electronics package 60 are configured, in this embodiment, with air passages 55 through the sensor plate 50 and around the electronics package 60 to provide air flow around the wheel that is similar to that which occurs when a wheel assembly 40 is mounted directly to the hub 44. The air flow around a rotating wheel 40 has been found to be quite complex and can have a significant effect on the aerodynamic forces applied to the vehicle under test. Providing openings through the measurement system 100, such as passages 55, allows lateral air flow that is more representative of the air flow and, therefore, the aerodynamic forces experienced by the vehicle in normal operation.

Figure 12:
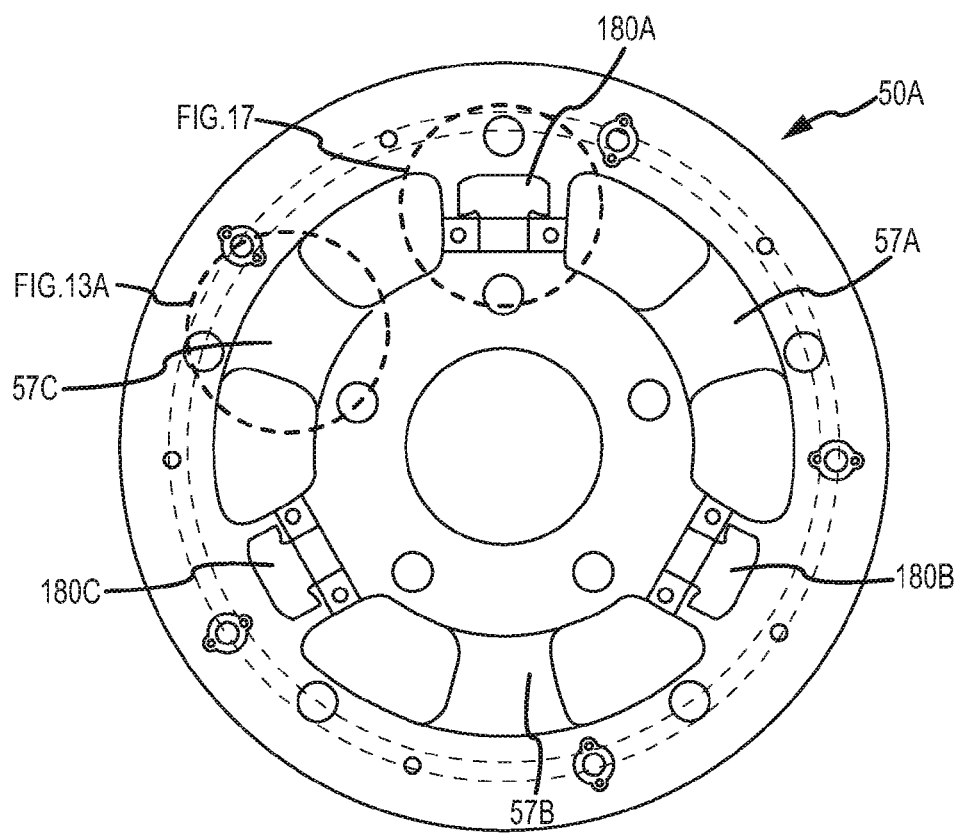
FIG. 12 is a side view of an exemplary sensor plate according to certain aspects of the present disclosure.
Figure 13A:
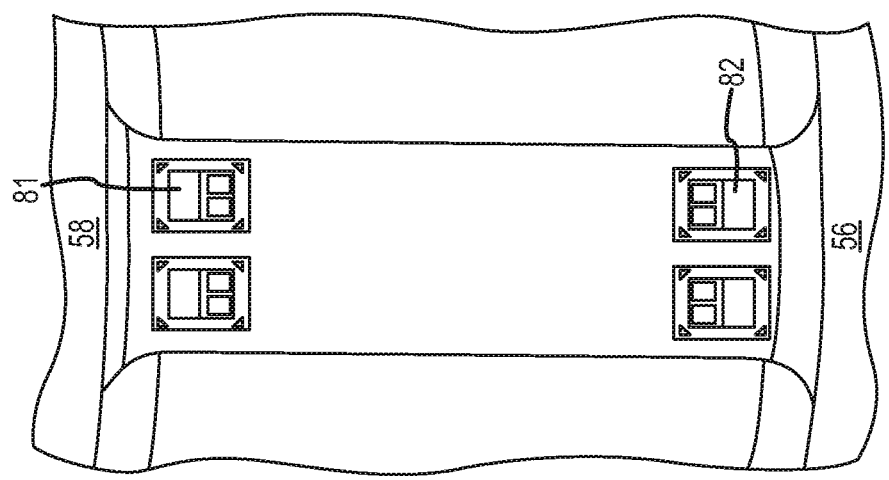
FIGS. 13A and 13B are front and back views, respectively, of a measurement arm according to certain aspects of the present disclosure.
Figure 17:
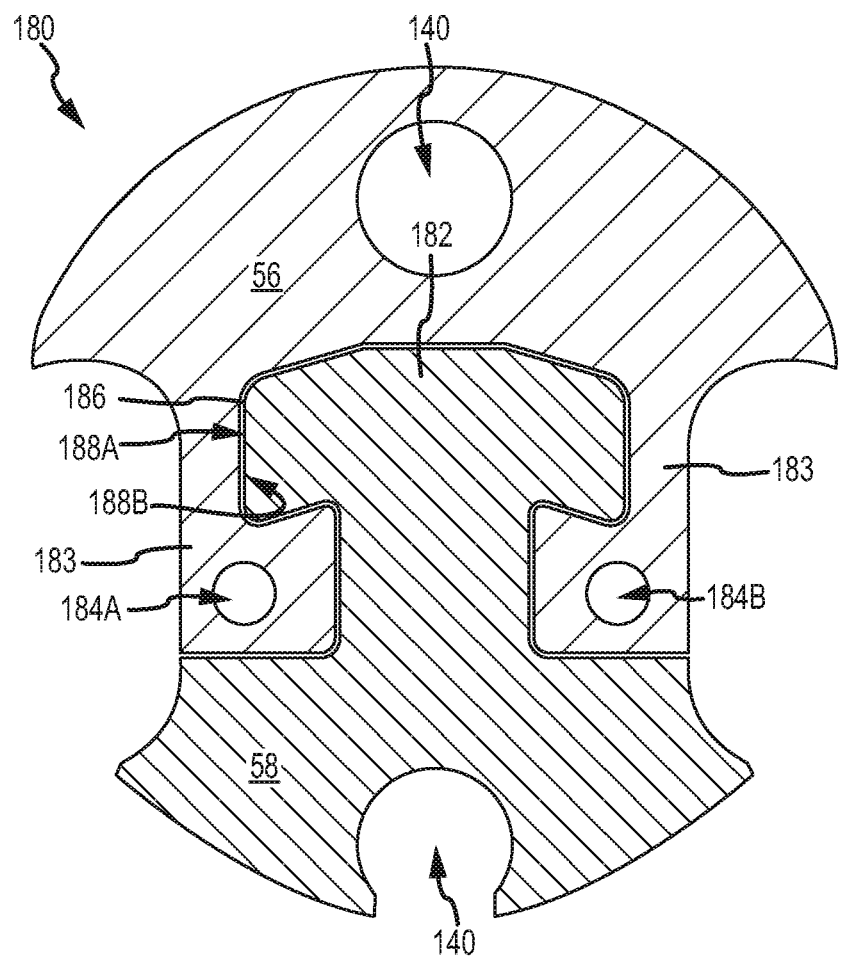
FIG. 17 is a side view of an exemplary motion limiting-arm according to certain aspects of the present disclosure.

FIG. 12 is a side view of an exemplary sensor plate 50A according to certain aspects of the present disclosure. The sensor plate 50A shown in FIG. 12 includes three measurement arms 57A, 57B, and 57C and three motion-limiting arms 180A, 180B, and 180C. The details of measurement arms 57 within the dashed-line circle labeled 'FIG. 13A' are shown in FIG. 13A. The details of motion-limiting arms 180 within the dashed-line circle labeled 'FIG. 17' are shown in FIG. 17.

Figure 13B:
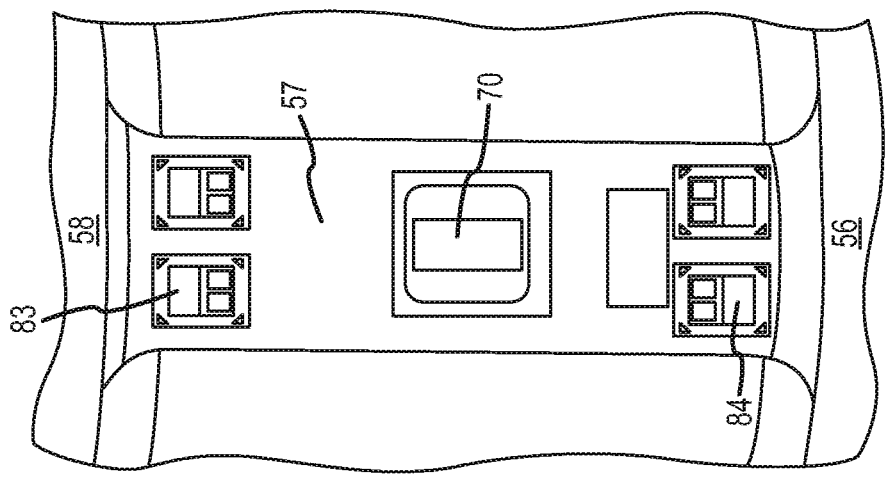

FIGS. 13A and 13B are front and back views, respectively, of a measurement arm 57 according to certain aspects of the present disclosure. The structure of measurement arm 57 is a constant-width bar that is, in this embodiment, continuous with the first and second sections 56, 58 of the sensor plate 57. In FIG. 13A, it can be seen that there are four strain gauges located at the ends of the measurement arm 57. In certain embodiments, these are unidirectional strain gauges. There also is a strain gauge assembly 70 that includes multiple resistive elements discussed further with respect to FIG. 13C.

FIG. 13B shows the opposite side of the same measurement arm 57 as shown in FIG. 13A. It can be seen that there are four strain gauges in locations that correspond to the four strain gauges of FIG. 13A. The function of these strain gauges is discussed in greater detail with respect to FIG. 13D.

Figures 13C, 13D:
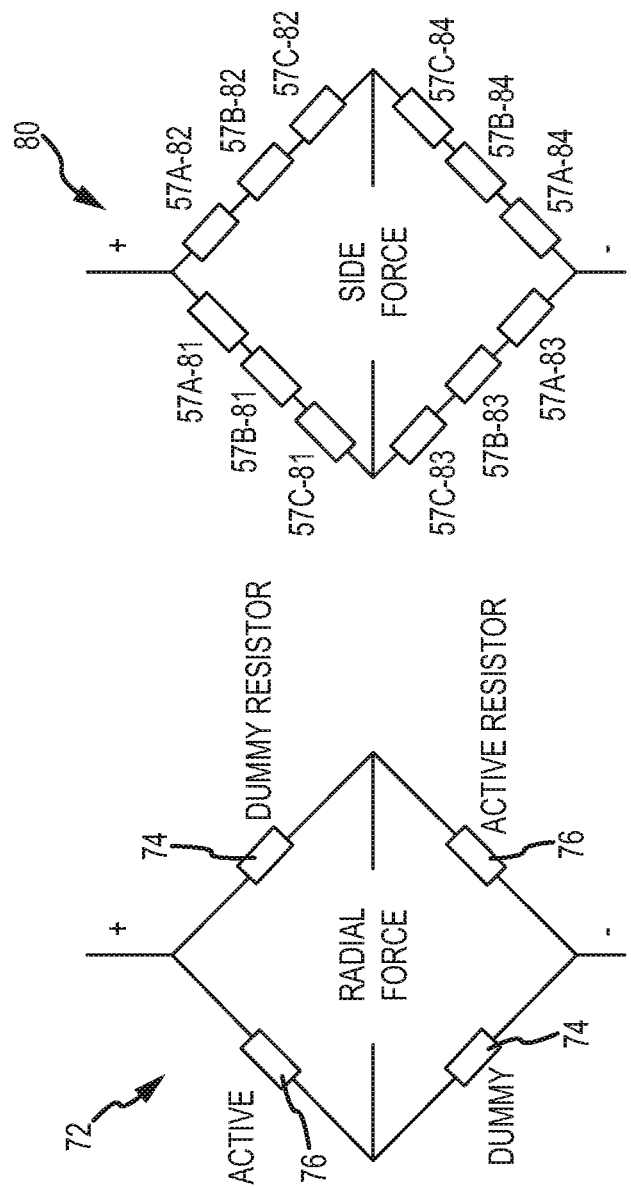
FIGS. 13C and 13D are exemplary circuit diagrams of certain measurement circuits of the electronics package according to certain aspects of the present disclosure.

FIGS. 13C and 13D are exemplary circuit diagrams of certain measurement circuits of the electronics package 60 according to certain aspects of the present disclosure. In certain embodiments, a portion of the interconnections of the circuit diagrams of FIGS. 13C and 13D are included in the sensor plate 50. FIG. 13C depicts a Wheatstone bridge 72 that is configured to measure the radial force, i.e. the vector sum of the vertical and longitudinal forces F2 and F3. The strain gauge assembly 70 includes two active strain gauge elements 76 whose sensitive directions are aligned with the measurement arm 57, i.e. along a radial line extending outwards from the axis of rotation of the wheel assembly 40, and two dummy strain gauge elements 74, i.e. strain gauges that are identical to those of strain gauge elements 76 but not configured to measure strain. The four elements 74, 76 are electrically connected as a Wheatstone bridge 72 as shown in FIG. 13C. The output of the Wheatstone bridge 72 is related to the radial strain of this measurement arm 57. The outputs of the multiple measurement arms 57 of a sensor plate 50 are combined in the electronics package to determine the vertical and longitudinal forces F2 and F3. In certain embodiments, each measurement arm's radial strain gauge is wired as a standalone Wheatstone bridge 72 so that additional signal processing can be performed on the separate outputs to eliminate the influence of centrifugal acceleration prior to summing them.

In certain embodiments, the longitudinal force F3 magnitude is determined two times per revolution by sampling one of the three radial strain gauge Wheatstone bridges 72 as the wheel assembly 40 passes 90 deg and 270 deg from top dead center, i.e., when the strain gauge assembly 70 is sensitive only to the longitudinal force. A rotational sensor, such as a Hall effect sensor, may be used to detect when a fixed point on the wheel 40 passes a fixed point on a non-rotating portion of the car 20, thereby providing rotational position information of the rotating measurement system 100 with respect to the car 20. For a system rotating at a high speed, sensing a single orientation during each revolution is sufficient to determine speed and to interpolate wheel position during the full rotation of the rotating system. As a result of this approach, the update rate for the longitudinal force F3 is dependent on wheel speed. However, the update rate is sufficiently high (4 Hz) even at 10 mph wheel speed. In certain embodiments, the single radial strain gauge output used to determine longitudinal force F3 has a high-gain amplifier applied to it and is calibrated over a smaller range of loads in anticipation of the relatively small longitudinal force F3.

The longitudinal force F3 can be either positive or negative and software logic is used to determine the sign. The sign of the longitudinal force F3 is determined by assessing whether the strain gauge 70 was in tension or in compression at the measurement angle in question, while also considering the coordinate system chosen (i.e., the positive longitudinal axis 24 points upstream, the positive lateral axis 26 in the direction that forward wheel rotation is positive using the right-hand rule). If the reference measurement arm 57 is at 90 degrees and strain gauge assembly 70 is in compression (positive strain gauge signal), then the longitudinal force F3 is negative. If strain gauge assembly 70 is in tension, then the longitudinal force F3 is positive. The reverse situation holds when the reference measurement arm 57 is at 270 degrees. If the reference measurement arm 57 is in compression, then the longitudinal force F3 is positive; if the measurement arm 57 is in tension, the longitudinal force F3 is negative.

FIG. 13D depicts a Wheatstone bridge 80 that is configured to measure the side force F1. In this embodiment, sensors from each of the three measurement arms 57A, 57B, and 57C of the sensor plate 50 of FIG. 12 are combined electrically. There are four strain gauges 81, 82, 83, and 84 attached at each of opposing sides of a first end and opposing sides of a second end of each of the measurement arm 57A, 57B, and 57C. The identification of which strain gauge 81, 82, 83, and 84 is mounted on each of the measurement arms 57A, 57B, and 57C is indicated by the nomenclature "measurement_arm#-strain_gauge#." For example, the strain gauge 81 that is mounted on measurement arm 57B is labeled in FIG. 13D as "57B-81."

When the wheel 48 bends in response to a pure side force F1, it deflects as shown in FIG. 8B and the measurement arms 57A, 57B, 57C are all deformed identically into the S-shape visible in FIG. 8B. In FIGS. 13A and 13B, where the first section 58 of the sensor plate 50 is at the top and the second section 56 is at the bottom, if the second section 56 is displaced laterally, i.e. moves outward from the page, strain gauges 81 and 84 are placed in tension while strain gauges 82 and 83 are placed in compression. It can be seen in FIG. 13D that the strain gauges 81, 84 that are placed in tension form a first pair of opposing legs of the Wheatstone bridge 80, while the strain gauges 82, 83 that are placed in compression form a second pair of opposing legs of the Wheatstone bridge 80.

The corresponding strain gauges of each measurement arm, for example strain gauges 57A-81, 57B-81, and 57C-81, are connected in series to form the various legs of the Wheatstone bridge 80 in the embodiment of FIG. 13D. This configuration has been found to have several advantages over the previous approach of digitizing and analyzing the individual strain gauge outputs. When the externally applied radial and side forces F1, F2, and F3 are nominally constant (which will generally be the case), the summed strain gauge outputs will also be constant. This means the signal processor 66 of the electronics package 60 does not need to acquire time-dependent (periodic) waveforms from individual gauges, nor do downstream processors (i.e. external systems 150 and 160 of FIG. 15) have to analyze such waveforms to extract steady-state information. This advantage, in turn, means that the analog-to-digital (A/D) sampling rates can be reduced and throughput rates improve dramatically. In addition, when in "Operate" mode in certain embodiments, the software will be configured to perform A/D continuously, so that the side force and radial force F1, F2, and F3 signals will be provided at the same rate and will be independent of wheel speed.

Figure 14:
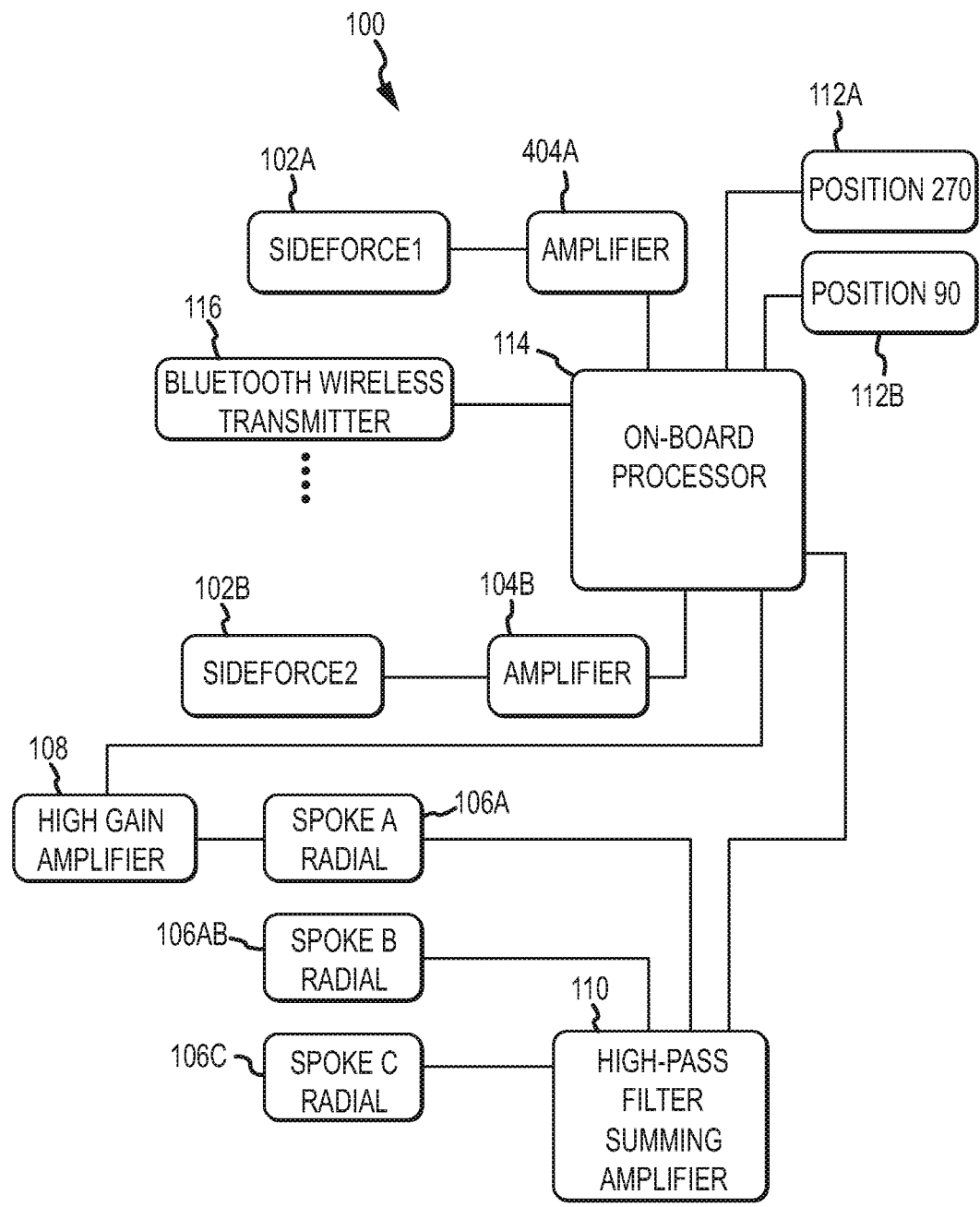
FIG. 14 is a block diagram of the electronics package and measurement arms according to certain aspects of the present disclosure.

FIG. 14 is a block diagram of the electronics package 60 and measurement arms 57 according to certain aspects of the present disclosure. The system includes the radial strain gauges 106A, 106B, and 106C of the measurement arms 57A, 57B, and 57C, the side force F1 sensor systems 102A and 102B, amplifiers 104A, 104B, 108, 110, and position sensors 112A, 112B.

Figure 15:
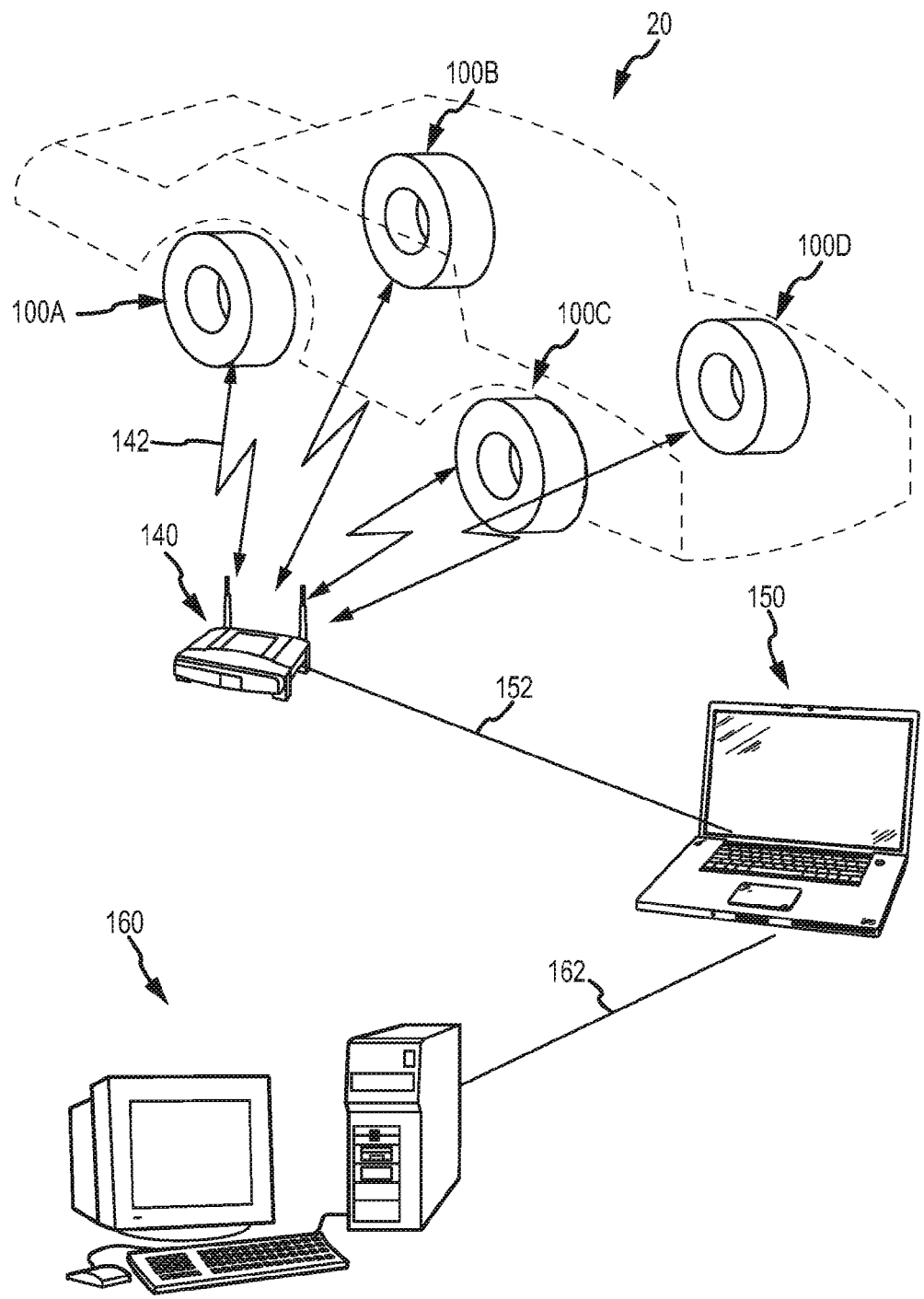
FIG. 15 is block diagram of an exemplary test configuration according to certain aspects of the present disclosure.

For lateral force processing, the output of lateral force bridge 80 of FIGS. 13C and 13D is amplified, digitized and passed to the standalone PC 150 of FIG. 15 where the calibration is applied. No further processing is required, because the sign of the side force is determined by the wiring of the strain gauge bridge.

Figure 16:
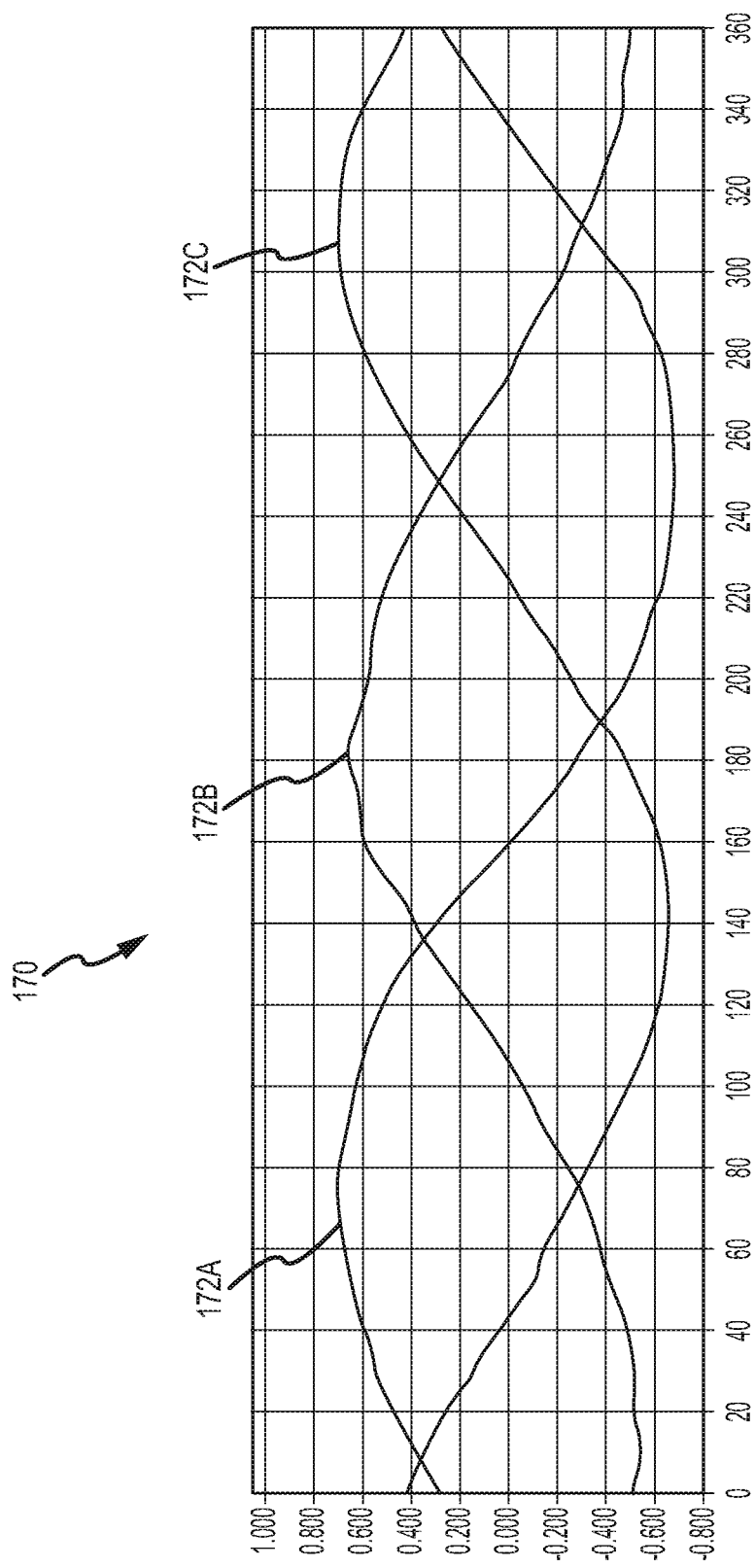
FIG. 16 is a plot of example outputs of the radial force sensors according to certain aspects of the present disclosure.

For radial force processing, the radial signals of bridge 72 require additional analog circuitry to remove the influence of centrifugal acceleration. On an individual gauge, a rotating wheel 40 produces a sine wave whose peaks are maximum tension (near top dead center) and maximum compression (near bottom dead center), i.e., when the measurement arm 57 is maximally sensitive to the vehicle's weight, as shown in FIG. 16. The peaks increase with increasing applied radial load. However, the DC offset (waveform average) of the signal varies with wheel speed due to changing centrifugal acceleration. Therefore, prior to combining the individual signals in a summing amplifier, it is necessary to implement an analog high-pass filter, for example a 0.5 Hz high-pass filter, to remove the DC offset.

Everything is provided to the processor 114 that digitizes the signals. In certain embodiments, the signals are sampled at 1 kilohertz. The four basic signals digitized are the radial and longitudinal forces, a combination of forces F2 and F3, and two redundant side forces F1. The four digitized signals are provided, in certain embodiments, via a wireless transmitter 116 and receiver (140 of FIG. 15) to a standalone computer (150 of FIG. 15), where additional processing is, in some cases, required.

FIG. 15 is block diagram of an exemplary test configuration according to certain aspects of the present disclosure. The car 20 under test has four measurement systems 100A, 100B, 100C, and 100D mounted respectively between the four wheel assemblies 40 and the respective hubs 44. The wireless transmitters 116 of each measurement system 100 send signals to the receiver 140 which passes them to the computer 150 over a first communication line 152. In certain embodiments, the computer 150 runs software that makes the data (i.e. the longitudinal, side, and vertical forces F1, F2, and F3 in engineering units) continuously available over the control room network 162 to, in this example, a central server 160.

The use of a wireless transmitter 116 allows the signals to be transmitted off the rotating measurement systems 100 such that wires, slip rings, etc. are not necessary. The telemetry allows for bi-directional communication between the rotating measurement systems 100 and the data acquisition system 150, 160. In addition to measurement signals being received from the rotating measurement systems 100, program parameters may be communicated to the measurement systems 100. In certain embodiments, the wireless transmitter 116 and receiver 140 include Bluetooth® technology to send wireless signals. In certain embodiments, the transmitter 116 and receiver 140 include ZigBee technology to send wireless signals. In certain embodiments, portions of the electronics in the measurement system 100 utilize a Controller Area Network (CAN) protocol conforming to the CAN 2.0 specification.

The measurement signals are processed in both the on-board electronics of system 100 and in the data acquisition system 150, 160. In certain embodiments, the individual measurement signals from each strain gauge are digitized and transmitted individually from the system 100 to the data acquisition system 150, 160. In certain embodiments, signals from multiple strain gauges are combined and the processed combination signal is transmitted from the system 100 to the data acquisition system 150, 160.

The data acquisition system may include one or more computing systems 150, 160 in communication via one or more communications networks 162. The computing systems may include standard personal computers or workstations and/or servers. The computing systems may be configured to execute one or more sequences of instructions stored on computer/machine-readable media to operate the wheel force measurement system 100 as described herein and process the data generated by the system for observation and further analysis. The data and processing results may be displayed on a user interface and/or stored on media within the system for later review and analysis.

FIG. 16 is a plot 170 of example outputs of the radial force according to certain aspects of the present disclosure. Each Wheatstone bridge 72 produces a sine wave that is synchronous with the rotation of the wheel assembly 40, where gravity is sensed in one polarity when the respective measurement arm 57 is pointed upward along the vertical axis 25 and sensed in a negative polarity when the respective measurement arm 57 is pointed in the opposite direction. In this example, three measurement arms produce sine waves 172A, 172B, and 172C that are offset by rotation angles of 120 degrees.

FIG. 17 is a side view of an exemplary motion-limiting arm 180 according to certain aspects of the present disclosure. In certain embodiments, there are three motion-limiting arms 180 positioned around the wheel 48 as shown in FIG. 12. For each motion limiting arm 180, there is a first element 182 that is coupled to the first section 58 and a second element 183 that is coupled to the second section 56. In this example, the first element 182 has a first shaped interface 188A in the general shape of a "T." The second element 183 has a second shaped interface 188B that is configured to conform to the first shaped interface 188A. There is a gap 186 between the first and second shaped interfaces 188A, 188B. In certain embodiments, this gap 186 is cut using wire electric discharge machining (EDM) after the wheel 48 has been fabricated as a single piece. Motion of the first section 58 with respect to the second section 56 is normal and expected, as the measurement arms 57 must deform slightly under the transmitted forces F1, F2, F3 and moments M1 and M2 in order to sense the respective forces and moments. The gap 186 is, in this embodiment, a constant value that is determined to provide adequate clearance for proper operation of the measurement arms 57 while also providing a safety feature in case a measurement arm 57 should break. In certain embodiments, the value of the gap 186 varies around the first element 182.

Figure 18:
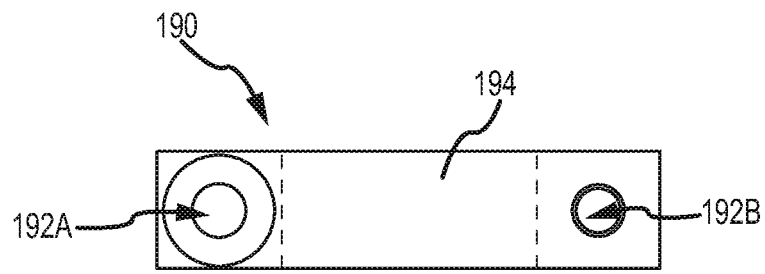
FIG. 18 is a side view of an exemplary motion-limiting side bar according to certain aspects of the present disclosure.

FIG. 18 is a side view of an exemplary motion-limiting side bar 190 according to certain aspects of the present disclosure. In certain embodiments, a side bar 190 is attached through holes 192A and 192B to the holes 184A and 184B of FIG. 17 on both sides of each motion-limiting arm 180 of the sensor plate 57. The side bars 180 are configured such that there is a gap (not visible in FIGS. 17 and 18) between the first element 182 and the area 194 of the side bars 190 such that the first section 58 can move laterally with respect to the second section 56 sufficient for the measurement arms 57 to operate properly.

The disclosed rotating measurement system includes a sensor plate with measurement arms that connect the vehicle hub to the wheel rim. Forces and moments passing between the hub and rim pass through the measurement arms allowing for measurement. The relatively thin sections and integral measurement arms allow for a narrow aerodynamic profile. The measurement arms are instrumented with strain gauges such that desired directional forces can be measured. In certain embodiments, the number of measurement arms per rotating measurement system is three, but the subject technology is not limited to this number.

In certain embodiments, the disclosed sensor plate is configured to be mounted between first and second components of a rotating assembly so as to measure at least one of the set that includes radial, longitudinal, and vertical forces as well as longitudinal and vertical moments that are transferred between the first and second components through the sensor plate.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for measuring forces applied to a moving vehicle, the system comprising:
   a sensor plate comprising:
      a first section configured to couple to a hub of the vehicle;
      a second section configured to couple to a corresponding wheel of the vehicle;
      a plurality of measurement arms each coupled between the first and second sections, each measurement arm having a first end, a second end, first side, and a second side; and
      a plurality of first sets of four strain gauges coupled to a respective one of the plurality of measurement arms, with one strain gauge of each first set attached at each of the first and second sides at each of the first and second ends of the corresponding measurement arm, wherein the strain gauges of corresponding locations on each measurement arm are electrically connected in series to form one of a leg of a Wheatstone bridge; and
   a lateral force measurement circuit electrically coupled to the Wheatstone bridge and configured to measure a total lateral force between the hub and the wheel and provide an output comprising at least one signal representative of at least a portion of the total lateral force.

2. The system of claim 1, further comprising a second set strain gauges disposed on the measurement arms so as to measure the strain associated with at least one of the longitudinal and vertical moments transferred between the first and second sections.

3. The system of claim 1, further comprising a third set of strain gauges disposed on the measurement arms so as to measure the strain associated with at least one of the longitudinal and vertical forces transferred between the first and second sections.

4. The system of claim 1, wherein the sensor plate further comprises a plurality of motion limiting arms, each motion limiting arm comprising:
   a first element coupled to the first section, the first element having a first shaped interface; and
   a second element coupled to the second section, the second element having a second shaped interface that is configured to conform to the first shaped interface with a determined gap between the first and second shaped interfaces.

5. The system of claim 1, wherein:
   the lateral force measurement circuit is configured to connect each of the four series-connected sets of the strain gauges as a respective leg of a Wheatstone bridge;
   the sets of strain gauges that are placed in one of tension or compression when the first portion is displaced laterally with respect to the second portion form a first pair of opposing legs of the Wheatstone bridge; and
   the sets of strain gauges that are placed in the other of tension or compression when the first portion is displaced laterally with respect to the second portion form a second pair of opposing legs of the Wheatstone bridge.

6. The system of claim 1, wherein the system is configured to operate without wires or mechanical attachments to external systems and to fit within a longitudinal profile of the wheel so as to reduce the effects of the measurement assembly on air flow around the wheel.

7. The system of claim 6, wherein the system is configured to provide at least one opening configured to allow air to pass laterally through the system while the measurement assembly is installed between the wheel and hub of the vehicle.

8. The system of claim 1, further comprising at least one rotational position sensor configured to detect at least one angular position of the wheel and provide a detection signal.

\* \* \* \* \*